Figure 1:
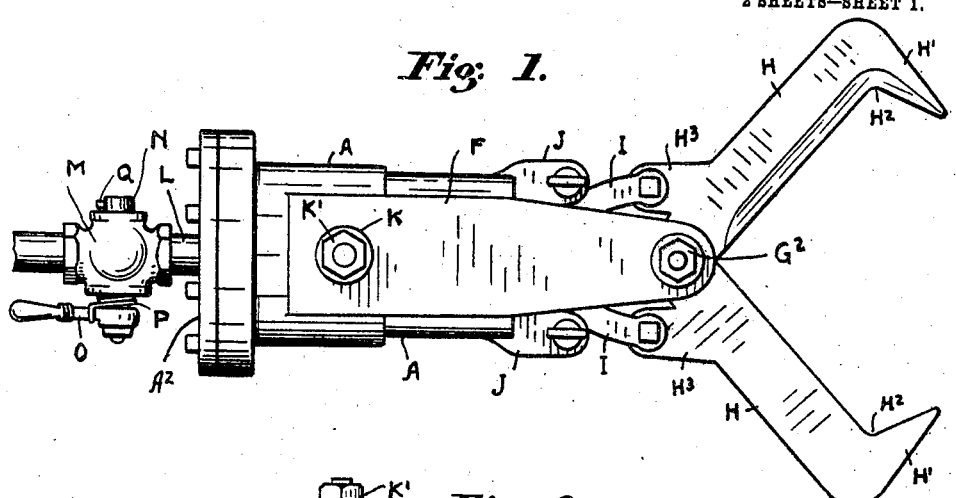

T. J. HOLDEN.
SHEARING DEVICE.
APPLICATION FILED OCT. 14, 1908.

944,555.

Patented Dec. 28, 1909.
2 SHEETS—SHEET 1.

WITNESSES:
Robt E Scott
Ethel L. Lister

INVENTOR
THOMAS J. HOLDEN,
BY
Thomas L. Ryan
ATTORNEY

T. J. HOLDEN.
SHEARING DEVICE.
APPLICATION FILED OCT. 14, 1908.

944,555.

Patented Dec. 28, 1909.
2 SHEETS—SHEET 2.

WITNESSES:
Robt E. Scott
Ethel L. Lister

INVENTOR
THOMAS J. HOLDEN,
BY
Thomas L. Ryans
ATTORNEY

UNITED STATES PATENT OFFICE.

THOMAS J. HOLDEN, OF MUNCIE, INDIANA.

SHEARING DEVICE.

944,555.  Specification of Letters Patent.  Patented Dec. 28, 1909.

Application filed October 14, 1908. Serial No. 457,619.

*To all whom it may concern:*

Be it known that I, THOMAS J. HOLDEN, a citizen of the United States, and a resident of Muncie, in the county of Delaware and State of Indiana, have invented a new and useful Shearing Device, of which I declare the following to be the specification.

This invention relates to improvements in shearing devices to be used in connection with glass forming machinery and has for its objects to provide a shears which will be positive and speedy in operation and which will perform the operation of shearing or severing the glass without mutilation or distortion of the same.

Further and more specific purposes are to provide a shears that will be of few parts, durable, not liable to get out of order or repair and which will be capable of easy application to use in connection with glass blowing machinery generally.

The objects of my invention are accomplished by the novel combination, construction and arrangement of parts described in this specification, defined in the appended claims and illustrated in the accompanying drawings.

While the preferred general construction, combination and arrangement of parts for carrying my invention into effect, is shown, it will be understood that minor changes may be made in the general structure, arrangement of parts and details within the scope of the appended claims, without departing from the nature or principle of my invention or sacrificing any of its advantages.

In the drawings similar characters of reference refer to corresponding parts throughout the several views, in which—

Figure 2:
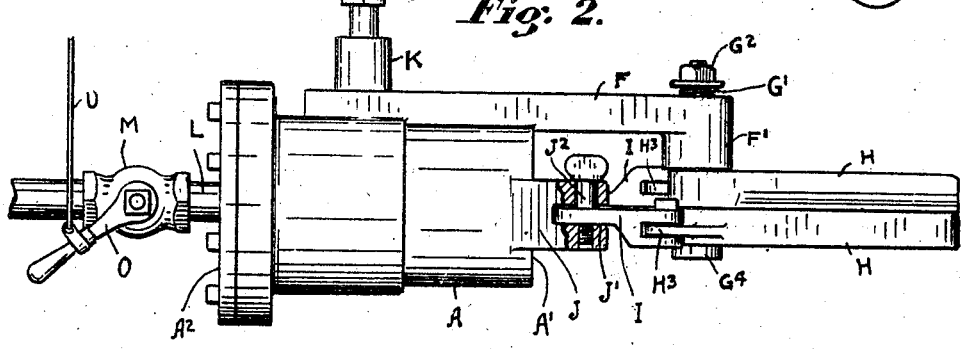
Figure 3:
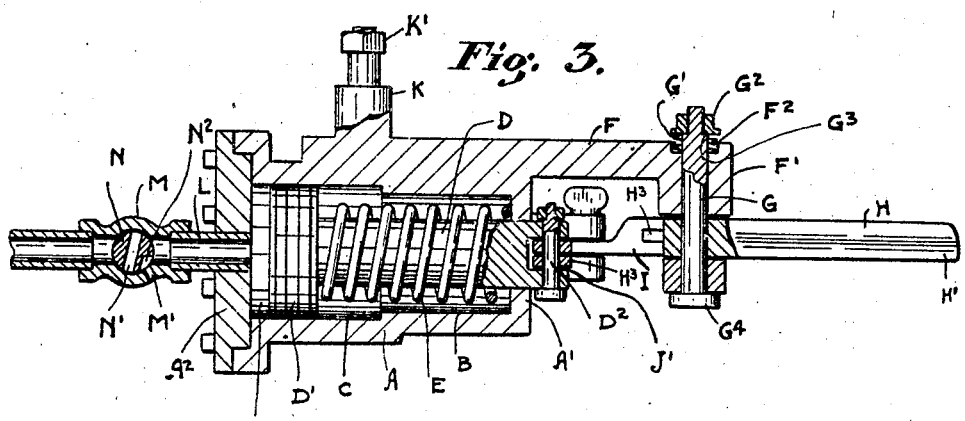
Figure 6:
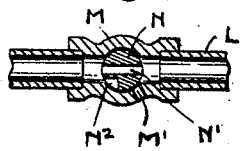
Figure 4:
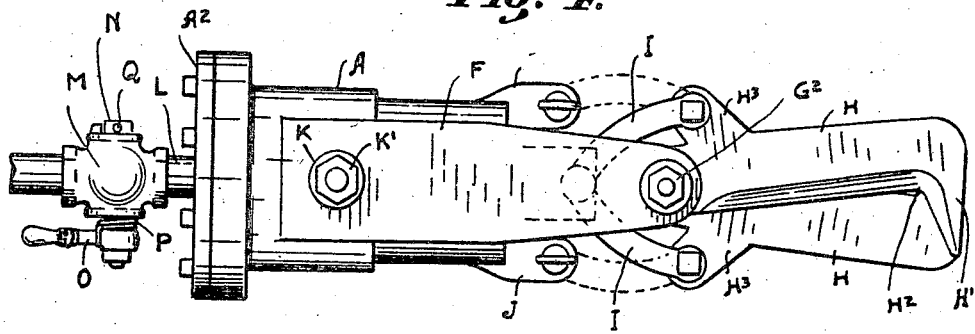
Figure 5:
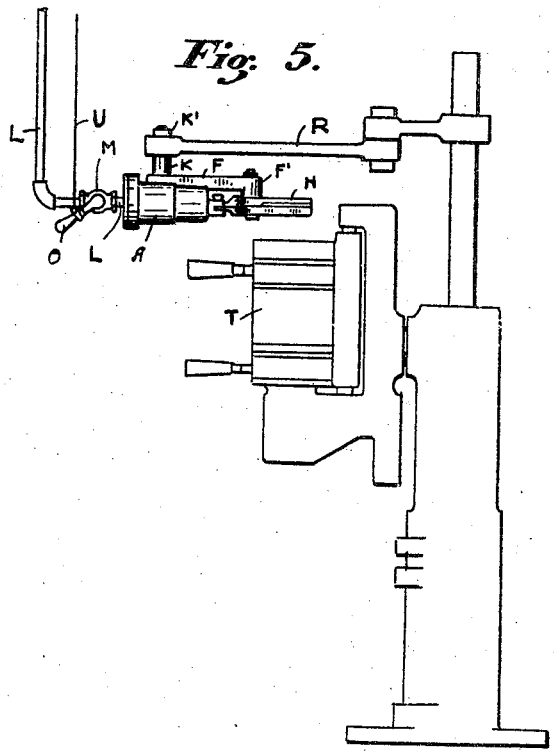

Figure 1 is a plan view, Fig. 2 is a side view and Fig. 3 is a longitudinal central sectional view of my invention. Fig. 4 is a plan view, the shear blades being shown in closed position. Fig. 5 is a view showing my invention in operative position as applied to use in connection with glass blowing machines having a movable mold thereon. Fig. 6 is a sectional view of the valve, the plug thereof being in the position shown in Fig. 4.

The metallic cylinder A has the bore B and the machined working chamber C. Adapted to move slidingly in a suitable aperture provided for it in the frontal head $A^1$ of the cylinder is the piston rod D. The piston head $D^1$ provided with the usual ring packing will move freely in the working chamber C. The cylinder head $A^2$ is of the general form and is bolted to the cylinder in the manner as shown.

Arranged on the piston is the coil-spring E one end of which bears against the interior side of the forward head $A^1$ and the other end against the piston head $D^1$, the function of which said spring is to press the piston toward the rear head $A^2$, as shown in Fig. 3.

Extending forwardly is the arm F which has the head $F^1$ disposed in a position at a point forward of the piston. Supported in this head is the pin G upon which pin are pivotally disposed the shear blades H. In the counter bore $F^2$ of the aperture in which the said pin resides, is the coil spring $G^1$. In assembling these parts the pin G is inserted through the suitable bores of the shear blades and passed through the aperture in the head $F^1$. When the nut $G^2$ is screwed down against the shoulder $G^3$ the coil spring will be compressed, and the head $G^4$ will bear against the under side of one of the shear blades, whereby they will be held firmly but yieldingly in the correct position as shown. These shear blades are formed with the inturned noses $H^1$, and the line of the cutting edge of each of the blades is of such contour that the curved portions $H^2$ will register when the blades are in the closed position as shown in Fig. 4. Each shear blade has the leg $H^3$ to which is pivotally connected the connecting bar I. The head of each of these connecting bars is slotted and engages the leg $H^3$ in the manner as shown in Fig. 2, and the rear heads of these connecting bars are connected to the forward end of the piston by the pin $D^2$, as plainly shown in Fig. 3.

Formed integrally upon the forward end of the cylinder are the lugs J each having the transverse slot $J^1$ therein of dimension proper to receive the rear head of one of the connecting bars I. Each lug is provided with the shouldered pin $J^2$ having a suitable thumb head. The distance apart center to center of these lugs is such that when the rear head of the connecting bar I is engaged by the said pin $J^2$ instead of by the pin $D^2$ as shown, the shear blade affected will be locked in the position as shown in Fig. 4. The connecting bar will occupy the dotted line position as shown in Fig. 4.

K designates a boss provided on the cylinder. The threaded end of this boss is provided with a nut $K^1$ whereby my improved shearing device may be connected to a suitable support member, adapted to sustain the device in the proper position adjacent the machine in conjunction with which my invention is to be operated.

In the pipe L which enters the cylinder through the cylinder head $A^2$, is the valve M. This valve is so constructed that it will afford at all times a vent from the cylinder, when the communication between the cylinder and the pipe L is shut off, and will close said vent when the communication between the cylinder and said pipe is open. The form and general structure of valve shown, I have found to work successfully; in this valve the plug N has the usual passage or aperture $N^1$. $N^2$ designates a recess in the side of said plug and which recess will register with and afford an exhaust from the cylinder through the vent $M^1$ when the plug is in closed position, as shown in Fig. 3. Secured to the head of the said plug is the handle bar O the function whereof is obvious. The spring P having its one end fastened to the valve and the other to the handle bar will sustain the plug in the normal position as shown in Fig. 1 and Fig. 3. The pin Q which is passed through and secured in the other end of the plug, has its one end adapted to rest against a suitable protuberance on the valve M so that the force of the spring P may not rotate the plug N more than the distance necessary to open and to close the communication through the pipe L into the cylinder.

R designates a support arm adapted to have secured to its end, the boss K. This support arm is secured to some part of the machine in connection with which my device is to be operated, or to some other suitable object, and is preferably of the jointed form of construction shown.

The mode of operation of my invention is apparent. By operating the valve M, communication through the pipe L into the cylinder is opened and the compressed air in the pipe L enters the cylinder. The piston is instantly actuated and with its quick movement forwardly the shear blades are operated and move into the closed position as shown in Fig. 4. With the reverse movement of the handle bar O the vent $M^1$ is opened and the coil spring E will speedily retract the piston and open the shears into the normal position as shown. By having the air space S between the piston head D and the cylinder head $A^2$ a cushion for the piston is provided.

When it is desired that one shear blade shall remain stationary while the other may be operated as usual, the rear head of the connecting bar of the shear blade that is not to be operated, is transposed from its connection with the piston to connection with the lug J. To effect said connection with the lug J the shouldered pin $J^2$ is removed, the rear head of the connecting bar I is disconnected from the piston D, by manipulation of the pin $D^2$ and then placed in position in the slot $J^1$ and the shouldered pin $J^2$ is returned to position. By this arrangement either one of the shear blades may be secured in fixed position with equal facility and the device is rendered capable of effective use in close quarters or peculiar situations where the double acting blades could not be used.

While it is obvious that my improved shearing device is of utility generally, wherever shearing operations are necessary, and may be used successfully for general purposes and operated with steam or compressed air, the purpose for which I deem my invention of especial utility and value is for the shearing of glass. To illustrate clearly the utility of my invention so applied to use, reference will be had to Fig. 5. In this view is illustrated in brief outline a portion of a glass forming machine having the usual receiving or blow mold T thereon. The shearing device is supported above and at a proper position with reference to the mold as shown, the pipe L having connections with a source of compressed air supply (not shown). U designates a chain or light flexible cable that extends from the handle bar O, over a pulley (not shown) and thence downwardly to the floor, where it may be connected to a foot plate adapted to be operated by the gatherer or by the operative who manipulates the mold. The gatherer disposes the "gather" above the mold, as the soft glass settles down into the mold, the handle bar O is operated, either by hand or by suitable handle or foot plate that may be used in connection with the cable U. By this opening of the valve M the shears are caused to be operated instantly in the manner as hereinbefore described. As the shear blades advance toward each other the soft glass is engaged by the curved portion $H^2$ and the edges immediately adjacent, the effect being that the transverse area of the glass is constricted; the spreading of the glass at the line of severance usual in ordinary shears having straight edged blades is prevented, and the marking or scaring of the glass at the line of severance is reduced to a minimum.

In the deposit of the glass in the mold for small necked bottles and the like it is essential that the soft glass should be severed in such manner that when it settles down into the mold the edges of the glass shall not lop or settle down over the edges of the opening in the mold.

It will be seen that with my device the soft glass, in the severing operation, is constricted or drawn toward a point by the shear blades and the severed end of the glass is of such shape that it will readily settle down into the mold and the necessity of any manipulation of the glass after it is so severed, to get it properly into the mold, is wholly dispensed with.

Ware made from glass severed by my improved shears is uniformly free from markings or blemishes. Other advantages obtained by my invention are that its operation is rapid, reliable and accurate.

What I claim as my invention and desire to secure by Letters Patent, is—

1. In a shearing device, the combination of a body provided with a working chamber, a piston therein having its head to move in said working chamber, a conduit leading into the said working chamber at the rear of said piston head there being a stop cock in said conduit, shear blades pivotally supported adjacent the said piston, power transmitting connections between the shear blades and said piston and means to urge the piston rearwardly and to normally retain the piston in rearward position.

2. In a shears, the combination of a cylinder, a piston therein, means to normally urge the piston to the rearward end of the cylinder, an inlet into and a vent at the rear end of the cylinder, a valve in said inlet arranged to simultaneously open the inlet and close the vent, an arm carried by and lugs formed on the forward end of the said cylinder, a pair of shear blades pivotally supported on said arm, each having an inturned nose, connecting bars to pivotally and detachably connect the legs of the shear blades to the piston or to the said lugs.

3. In a shears, the combination of a cylinder having a piston therein, a coil spring about the said piston to urge the latter rearwardly, an inlet into and a vent at the rear end of the cylinder, a valve in said inlet arranged to simultaneously open the inlet and close the vent an arm carried by and extending forwardly of the cylinder, complemental shear blades pivotally supported on said arm, a bifurcated lug on either side of said cylinder each having a removable pin therein, connecting bars adapted to pivotally and detachably connect the legs of the shear blades to the piston or to the said lugs.

In testimony whereof I sign my name to this specification in the presence of two subscribing witnesses.

THOMAS J. HOLDEN.

Witnesses:
THOMAS S. RYAN,
ETHEL L. LISTER.